United States Patent [19]
Blades

[11] Patent Number: 5,572,647
[45] Date of Patent: Nov. 5, 1996

[54] VISIBILITY SEEKING SCROLL BARS AND OTHER CONTROL CONSTRUCTS

[75] Inventor: Jerry A. Blades, Rochester, Minn.

[73] Assignee: International Business Machines Corporation, Armonk, N.Y.

[21] Appl. No.: 334,732

[22] Filed: Nov. 4, 1994

[51] Int. Cl.⁶ .................................................. G06F 3/14
[52] U.S. Cl. .................................................. 395/326
[58] Field of Search .................................. 395/155, 157, 395/158, 159, 156, 148; 345/120, 124

[56] References Cited

U.S. PATENT DOCUMENTS

| | | |
|---|---|---|
| 4,542,376 | 9/1985 | Bass et al. . |
| 4,586,035 | 4/1986 | Baker et al. . |
| 4,642,790 | 2/1987 | Minshull et al. . |
| 4,831,556 | 5/1989 | Oono . |
| 4,890,098 | 12/1989 | Dawes et al. ............................ 345/120 |
| 5,062,060 | 10/1991 | Kolnick ................................... 395/159 |
| 5,196,838 | 3/1993 | Meier et al. . |
| 5,237,653 | 8/1993 | Noguchi et al. . |
| 5,250,929 | 10/1993 | Hoffman et al. . |
| 5,289,205 | 2/1994 | Torres ...................................... 345/124 |
| 5,347,626 | 9/1994 | Hoeber et al. ........................... 395/156 |
| 5,416,895 | 5/1995 | Anderson et al. ....................... 395/148 |

*Primary Examiner*—Mark R. Powell
*Assistant Examiner*—Ruay Lian Ho
*Attorney, Agent, or Firm*—Lance L. Vietzke; John P. Sumner

[57] ABSTRACT

A system and method for automatically repositioning and/or resizing scroll bars and other control constructs within a computer window environment. The system monitors the control constructs corresponding to open windows on the display device in order to determine if any of the control constructs are at least partially obstructed or not controllable. This monitoring may occur during each refresh of the display device. If any of the control constructs are not visible or controllable, the system automatically repositions and/or resizes the control construct so that it is visible and/or may be controlled by an operator.

28 Claims, 6 Drawing Sheets

VISIBILITY SEEKING SCROLL BARS AND OTHER CONTROL CONSTRUCTS

FIELD OF THE INVENTION

The present invention relates to a system for repositioning and/or resizing scroll bars and other control constructs within a computer window environment.

BACKGROUND OF THE INVENTION

Computer programs are often represented by windows presented on a display device. An operator may select a program through the corresponding window. These windows often have scroll bars, which allow an operator to scroll through information presented within the window. In addition, many windows have dialog boxes or other types of control boxes, which allow an operator to control the window. For example, an operator may use a dialog box to open or close the corresponding window.

An operator often has many windows open at once on the display device. These windows usually overlie one another such that a window on top of another window will at least partially cover information in the bottom window. When multiple windows are open on a display device, the scroll bars or control constructs of some windows most likely will be covered and not visible, or partially covered such that an operator cannot fully access the control construct. Therefore, in order to access and manipulate the scroll bar or control construct, the operator must typically reposition the window or bring the window to the foreground, manipulate the scroll bar or control construct, and then return the window to the background or to its previous position. This is a time-consuming process for an operator and interrupts the natural flow of working with the windows and the underlying programs.

SUMMARY OF THE INVENTION

The present invention provides an improvement upon the visibility and/or controllability of control constructs in a computer window environment. A system, or method, which implements the present invention monitors windows open on a display device in order to determine if a particular control construct is at least partially not visible or controllable. Upon such detection, the system determines if it can reposition and/or resize the control construct so that it is visible and/or controllable by an operator. The system then automatically repositions and/or resizes the control construct in order to best provide visibility and/or controllability of the control construct.

DETAILED DESCRIPTION

Overview

The present invention provides a method and system for repositioning and/or resizing scroll bars and other control constructs. The system monitors windows open on a display device in order to determine if a particular scroll bar or control construct is at least partially not visible or controllable. Upon such detection, the system determines if it can reposition the scroll bar or control construct such that it is either visible or controllable. The system then proceeds to reposition the scroll bar or control construct, if possible.

Otherwise, the system determines if it can resize the scroll bar or control construct such that it is visible and/or controllable. If that is possible, the system resizes the scroll bar or control construct, and may alternatively reposition the scroll bar or control construct as well. The system automatically resizes and/or repositions scroll bars and other control constructs such that an operator need not manually reposition windows in order to manipulate scroll bars and control constructs which are not visible or controllable.

System Processing

Figure 1:
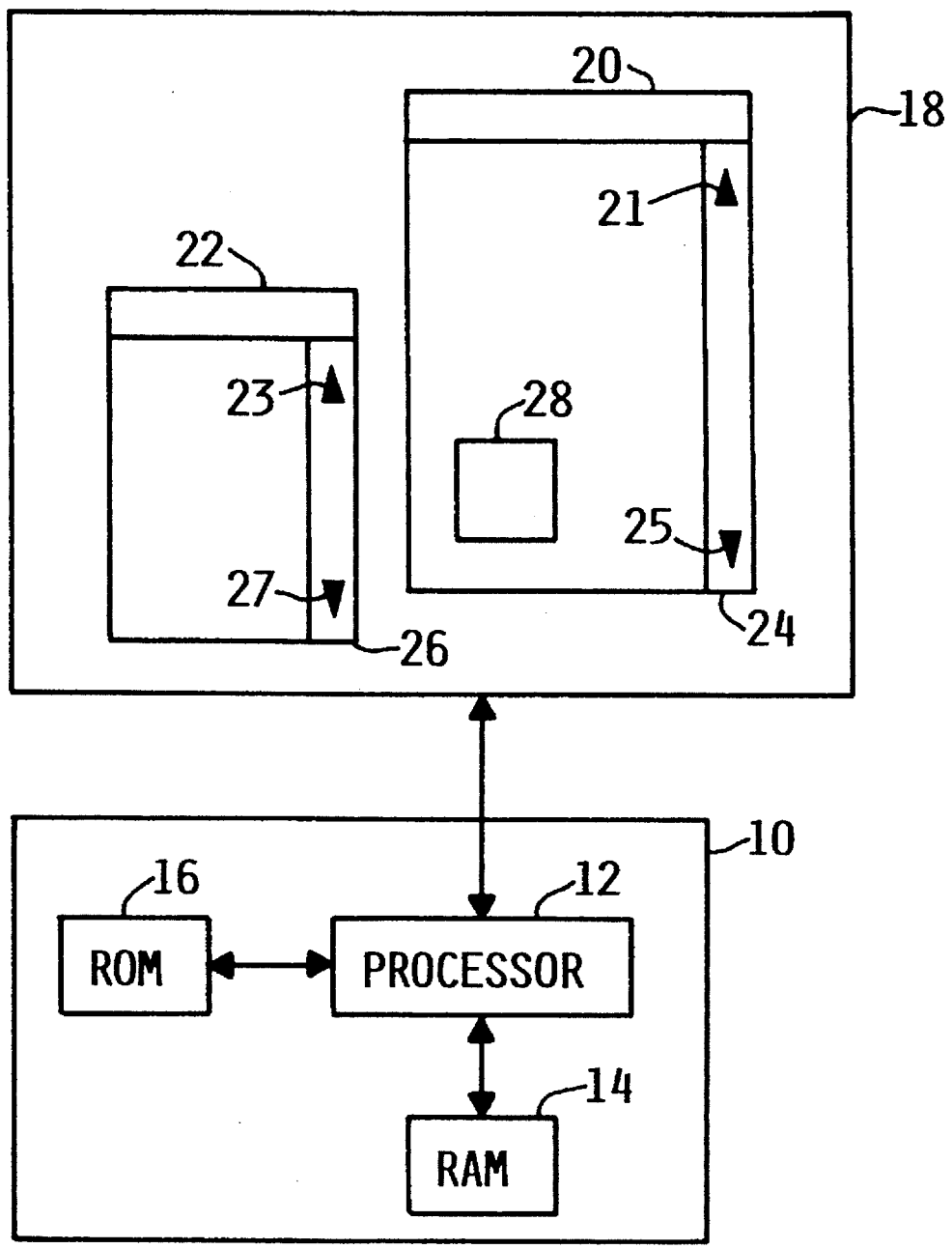
FIG. 1 is a block diagram of a computer-based system interfacing with a display device for presenting and controlling windows on a display device.

FIG. 1 is a diagram of a system in which the present invention may operate in order to control the position and/or size of scroll bars and other control constructs. A computer 10 includes a processor 12 which interacts with a display device 18. The computer 10 typically includes a random access memory 14, and a read only memory 16 which may store, for example, an operating system for the computer 10. The computer 10 may be implemented with, for example, a personal computer or a workstation controller.

The display device 18 is shown as presenting computer windows 20 and 22. The display device 18 may be implemented with, for example, a computer monitor. These computer windows typically have scroll bars 24 and 26. The scroll bars 24 and 26 may be manipulated by an operator for scrolling information presented within the computer window. For example, an operator may use a cursor control device, such as a "mouse," in order to position the cursor on the "up arrow" (21, 23) or "down arrow" (25, 27) within the scroll bars 24 and 26 in order to scroll the presented information up or down respectively.

The computer window 20 is, furthermore, shown with a dialog box 28, which may include information related to controlling the computer window 20. For example, the dialog box 28 may include an error message alerting the operator of a particular error within the operation of the computer window 20 or underlying program. The present invention is not limited to scroll bars and dialog boxes. It is for use with control constructs in general. Control constructs include, but are not limited to, scroll bars, dialog boxes, tool bars, menu bars, and command bars. Control construct refers generally to any information presented which corresponds to control or operation of a computer window or underlying program.

The present invention monitors the display device 18 in order to determine if, for example, the scroll bars 24 and 26 or dialog box 28 are no longer visible or controllable on the display device 18. If that occurs, the system may automatically reposition and/or resize the scroll bars or other control construct so that they are visible and/or controllable on the display device 18.

Figure 2:
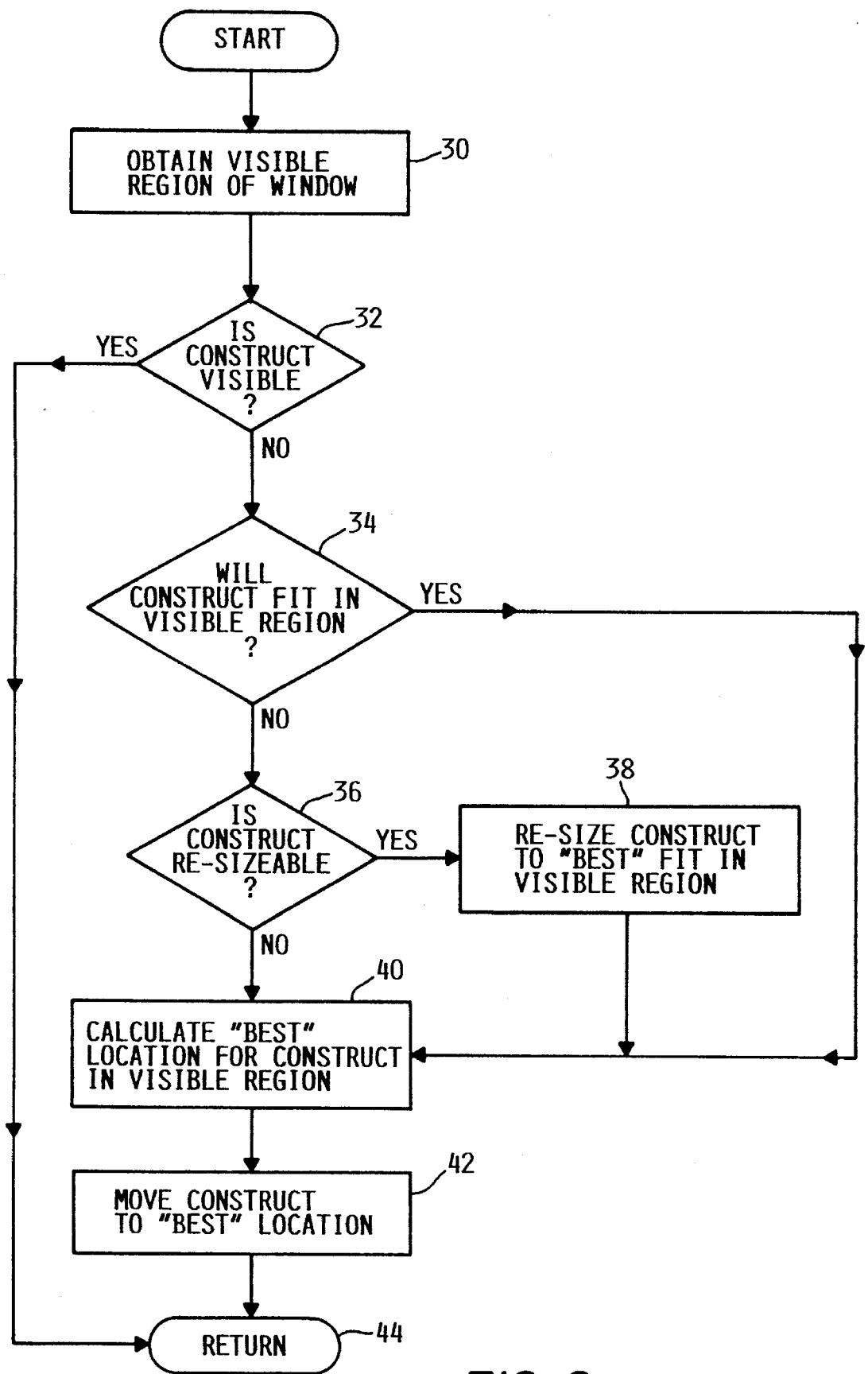
FIG. 2 is a flow chart of a preferred process for controlling scroll bars and other control constructs within computer windows.

FIG. 2 is a flow chart of a preferred process for controlling the visibility and/or controllability of control constructs. The routine shown in FIG. 2 may be executed, for example, on each redraw of the screen on the display device 18 by the window refresh control of the operating system (OS) or presentation manager within the computer 10, or within a workstation controller coupled to "dumb" terminals. The system preferably performs this routine for each control construct of each window. For example, the system may sequence through each window and corresponding control construct in order to continually update (reposition and/or resize) control constructs which are not visible and/or controllable.

The system first obtains the visible region of a particular computer window (30). At step 32, the system determines if a control construct is visible in the computer window. This step may involve determining if the control construct is fully visible, only partially visible, or obstructed such that is not fully or partially controllable by an operator.

The system then determines if the control construct will fit within the visible region of the computer window (34). If there is sufficient space in the visible region for the control construct, then the system calculates the "best" location for the construct in the visible region (40). Otherwise, the system preferably determines (36) if the construct is resizable. If it is resizable, then the system resizes the construct to best fit in the visible region (38).

Otherwise, the system proceeds to calculate the "best" location for the construct without resizing (40). Following step 40, the system then automatically moves the construct to the best location (42), and returns (44). The system may alternatively first perform resizing and then repositioning, or a combination of both. Also, instead of repositioning or resized obstructed control constructs, the system may reposition or resize at least a portion of the window which obscures a control construct so as to render the control construct visible and/or controllable.

Table 1 is a listing of a preferred pseudo code routine for implementing the present invention within a computer system.

TABLE 1

```
{
    Obtain visible region of the window associated with
    this construct.
```

TABLE 1-continued

```
    if (control construct is not sufficiently in visible
    region of Window).
    {
        if (construct will fit in the visible area of the
        window)
        {
            Calculate "best" location for control construct in
            visible area of the Window. (For example, in the
            case of a scroll bar this location could be toward
            or at the opposite edge of the window, and in the
            case of a dialog box this location could be the
            minimum x,y delta necessary to make the dialog box
            visible.)
        }
        else
        {
            if (control construct is resizable)
            {
                Resize control construct to "best" fit in
                visible portion of the window; (This may
                included making the control construct smaller
                than the visible region in some cases in order
                to allow the operator to see data of some type.)
                Calculate "best" location for control construct
                in visible area of the Window.
            }
            else
            {
                Calculate "best" location for control construct
                in visible area of the window. (The system may
                be able to only present a portion of the control
                construct; for example, presenting only the
                "OK" button on the dialog box, with "Cancel"
                still covered or off-screen.)
            }
        }
        Move control construct to "best" location;
        Redraw visible portion of window;
    }
    else
    {
        Do nothing, still visible;
    }
}
```

Repositioning/Resizing Control Constructs

Figure 3:
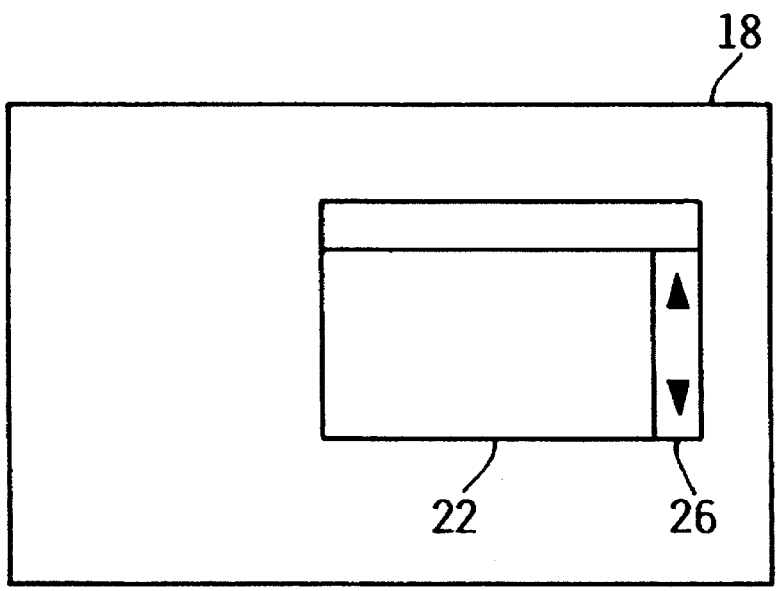
FIG. 3 is a diagram of a display device presenting a computer window with a scroll bar.
Figure 4:
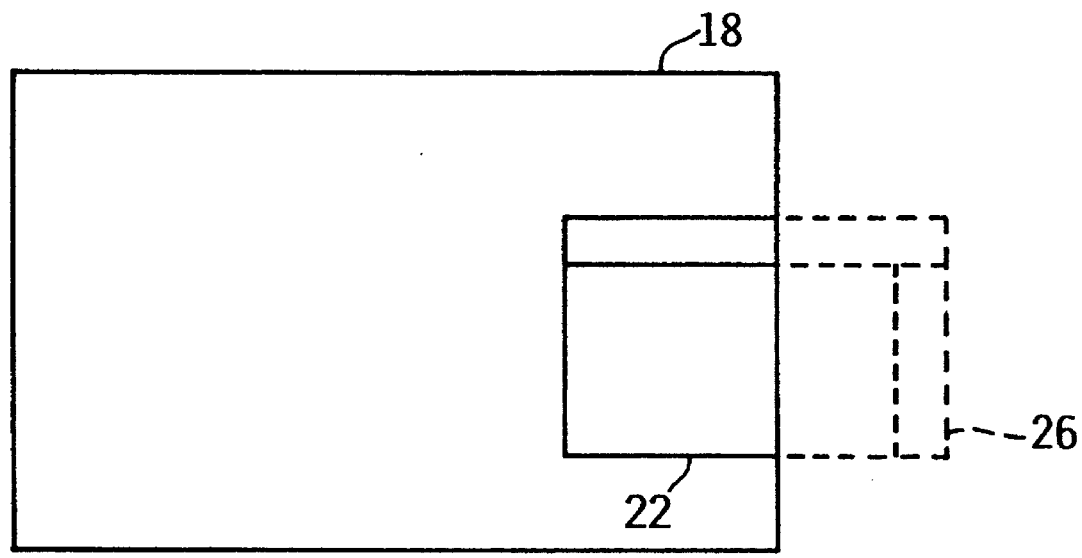
FIG. 4 is a diagram of a display device presenting a computer window in which the window has been moved so that the scroll bar is not visible.

FIGS. 3–6 show an example of repositioning a scroll bar which has become not visible due to the repositioning of a computer window. FIG. 3 shows a display device 18 presenting computer window 22 with scroll bar 26. Consider, for example, if the operator moves computer window 22 to a new location shown in FIG. 4. In this new location, the scroll bar 26 is now off of the screen and thus not visible on display device 18. The system monitoring the screen determines that scroll bar 26 is no longer visible and/or may not be manipulated by an operator. Based on that determination, the system determines if the scroll bar may be repositioned and/or resized so that it is visible and/or controllable.

Figure 5:
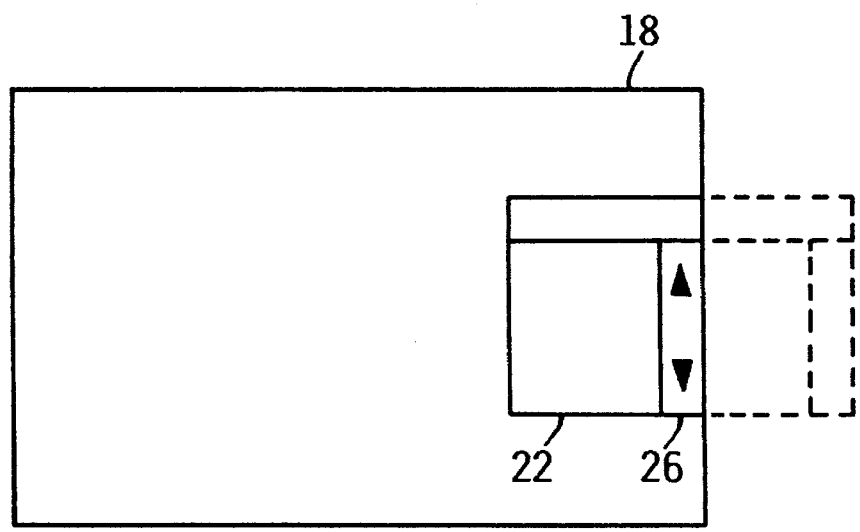
FIG. 5 is a diagram of a display device presenting a computer window after the system has repositioned a scroll bar which was previously not visible.
Figure 6:
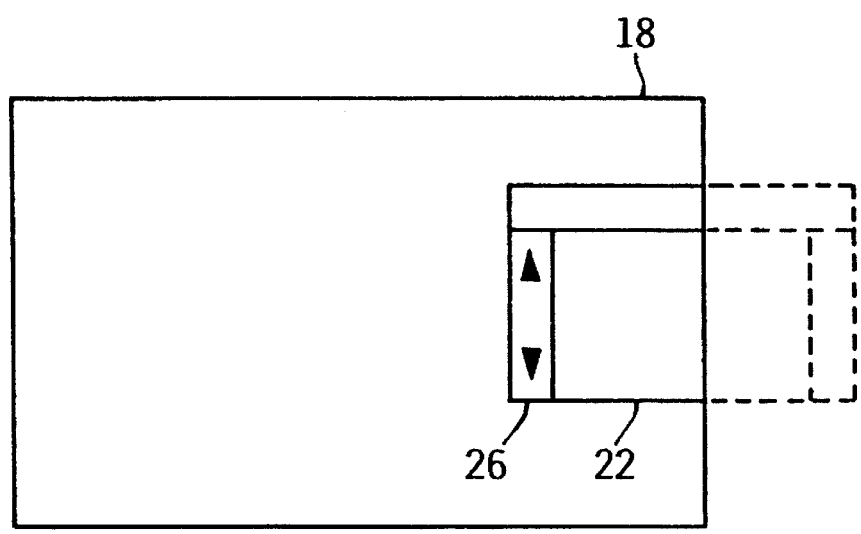
FIG. 6 is a diagram of a display device presenting a computer window after the system has repositioned a scroll bar to a alternate location.

FIG. 5 shows the results of the system processing, according to the present invention, for repositioning scroll bar 26. As shown in FIG. 5, the scroll bar 26 has now been repositioned such that it is on the right edge of the screen and visible on display device 18. Alternatively, the system could reposition the scroll bar 26 on the left edge of the computer window 22. This is shown in FIG. 6. The particular placement of the scroll bar following the reposition is not dependent on any one particular location; the system repositions and/or resizes the scroll bar such that it is visible and/or may be manipulated by the operator.

Figure 7:
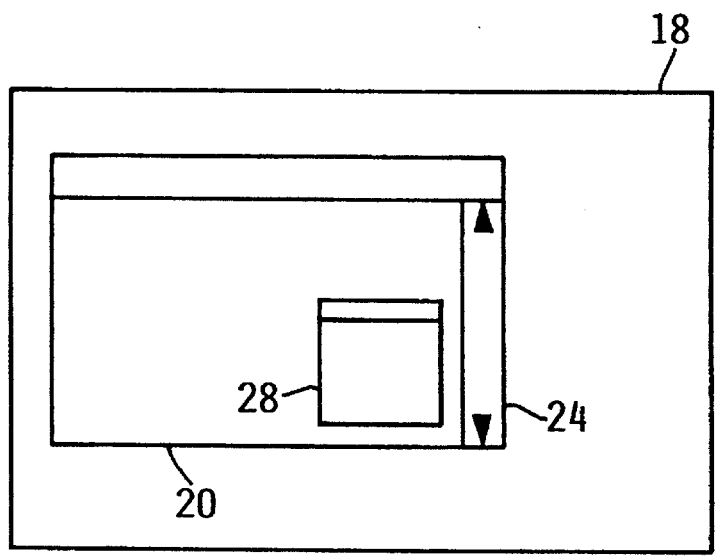
FIG. 7 is a diagram of a display device presenting a computer window with a dialog box and a scroll bar.
Figure 8:
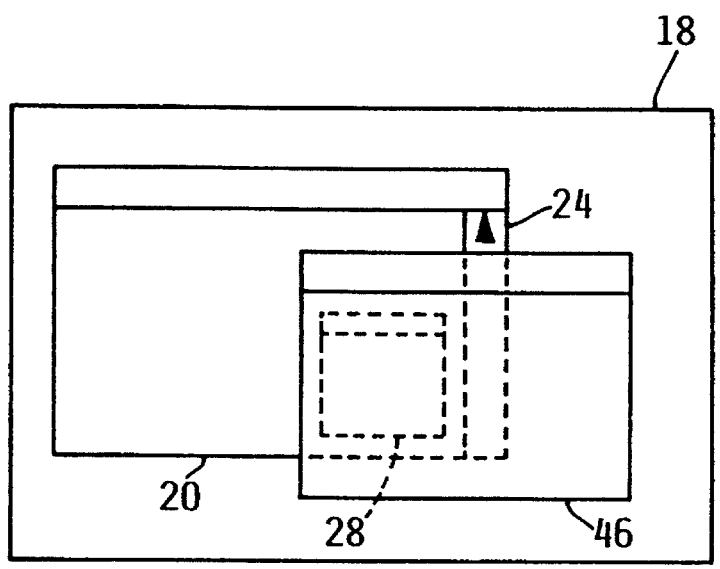
FIG. 8 is a diagram of a display device presenting a computer window with a dialog box which has been completely covered, and a scroll bar which has been partially covered, by another computer window.

FIGS. 7–10 show an example of repositioning a dialog box and a scroll bar within a computer window. FIG. 7 shows a display device 18 presenting a computer window 20 with a scroll bar 24 and dialog box 28. Consider, for example, a situation where an operator has moved another window 46 such that it is obstructing the dialog box 28 and partially obstructing the scroll bar 24. This situation is shown in FIG. 8. The system monitors the screen on the display device 18 and determines that the dialog box 28 is no longer visible and the scroll bar 24 is partially obstructed and thus not fully controllable. While the scroll bar 24 may still be manipulated by an operator to scroll up, the partial obstruction means that the operator may not scroll down. The system therefore determines if the scroll bar 24 may be repositioned and/or resized such that the operator will have full capabilities to manipulate the scroll bar 24.

Figure 9:
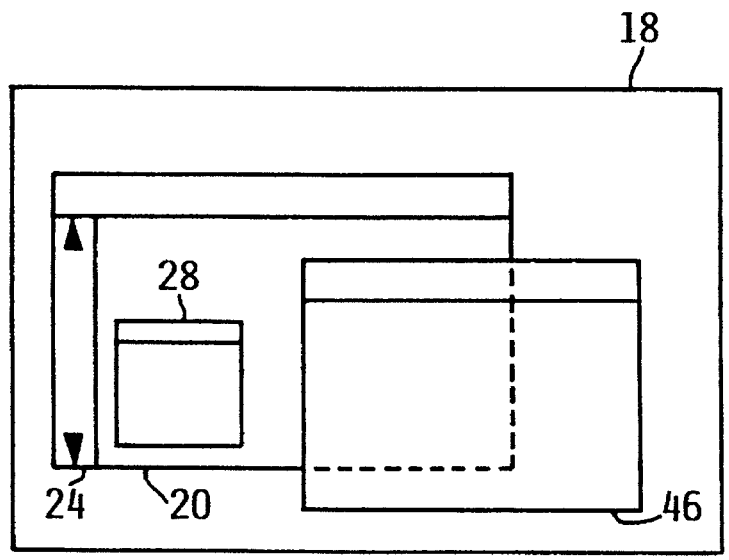
FIG. 9 is a diagram of a display device presenting a computer window with a repositioned dialog box which was previously not visible, and a repositioned scroll bar which was previously partially not visible.
Figure 10:
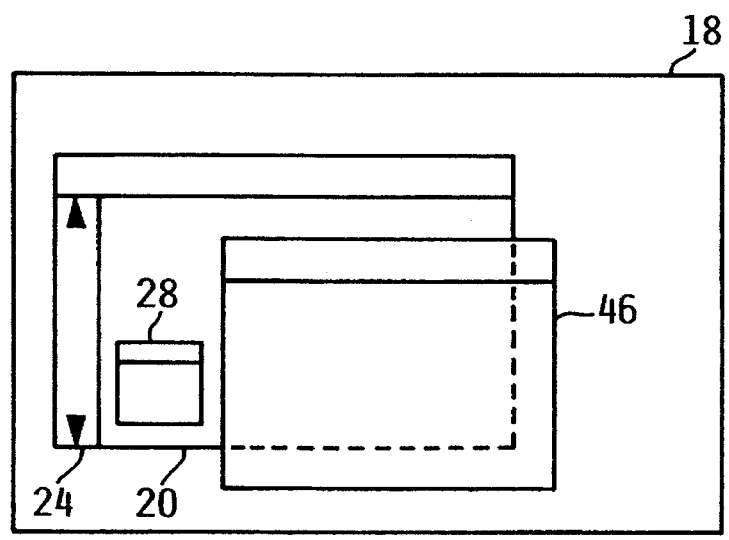
FIG. 10 is a diagram of a display device presenting a computer window with a repositioned and resized dialog box which was previously not visible, and a repositioned scroll bar which was previously partially not visible.

As shown in FIG. 9, the system has repositioned the dialog box 28 within the computer window 20 such that it is now fully visible. The system has, furthermore, repositioned the scroll bar 24 such that an operator has full manipulation of the scroll bar 24. The system may alternatively, as described above, resize the dialog box 28 or scroll bar 24 if, for example, sufficient room is not available within the window 20 for repositioning the control construct so that it is fully visible. This situation is shown in FIG. 10, where the system has resized the dialog box 28 to fit within the "smaller" amount of space created by the window 46 obstructing more of the window 20.

While the present invention has been described in connection with the preferred embodiment thereof, it will be understood that many modifications will be readily apparent to those skilled in the art, and this application is intended to cover any adaptations or variations thereof. It is manifestly intended that this invention be limited only by the claims and equivalents thereof.

What is claimed is:

1. In a data-processing system having a display device capable of displaying multiple objects, one of said objects being a window having an associated control construct and having a control device adapted to be used by an operator for controlling said multiple objects including said control construct, apparatus for enhancing the visibility or controllability of said control construct, comprising:

presentation means for displaying said objects, including said window object and said control construct, on said display device;

electronic decision means for automatically determining that said control construct displayed on said display device is positioned so as to at least partially obscure said construct from a view of the operator or to prevent manipulation of said construct by the operator at said display device; and electronic positioning means operable in response to said determination for automatically moving at least a portion of said control construct so as to render said control construct visible on said display device or controllable by said operator.

2. The system of claim 1, wherein said electronic positioning means comprises means for automatically moving at least a portion of said remaining objects.

3. The system of claim 1, wherein said electronic decision means comprises means for automatically determining that at least one of said remaining objects on said display device overlies said control construct on said display device.

4. The system of claim 1, wherein none of said remaining objects overlie said control construct on said display device subsequent to said moving of said control construct by said electronic positioning means.

5. The system of claim 1, wherein said electronic positioning means comprises means for automatically moving said control construct independently of said window object.

6. The system of claim 1, wherein said electronic positioning means comprises means for automatically moving said control construct from a first position to a second position.

7. The system of claim 1, wherein said electronic positioning means comprises means for automatically resizing said window object on said display device.

8. A data-processing system, comprising:

a display device capable of displaying multiple objects, one of said objects being a window having an associated control construct;

a control device adapted to be used by an operator for controlling said multiple objects including said control construct;

presentation means for displaying said objects, including said window object and said control construct, on said display device;

electronic decision means for automatically determining that said control construct displayed on said display device is positioned so as to at least partially obscure said construct from a view of the operator or to prevent manipulation of said construct by the operator at said display device; and electronic positioning means operable in response to said determination for automatically moving at least a portion of said control construct so as to render said control construct visible on said display device or controllable by said operator.

9. The system of claim 8, wherein said electronic positioning means comprises means for automatically moving at least a portion of said remaining objects.

10. The system of claim 8, wherein said electronic decision means comprises means for automatically determining that at least one of said remaining objects on said display device overlies said control construct on said display device.

11. The system of claim 8, wherein none of said remaining objects overlie said control construct on said display device subsequent to said automatic moving of said control construct by said electronic positioning means.

12. The system of claim 8, wherein said electronic positioning means comprises means for automatically moving said control construct independently of said window object.

13. The system of claim 8, wherein said electronic positioning means comprises means for automatically moving said control construct from a first position to a second position.

14. The system of claim 8, wherein said electronic positioning means comprises means for automatically resizing said window object on said display device.

15. In a data-processing system having a display device capable of displaying multiple objects, one of said objects being a window having an associated control construct, a method for enhancing the controllability of said control construct, said method comprising:

displaying said window object and said control construct on said display device;

displaying the remaining ones of said objects on said display device;

automatically determining that said control construct displayed on said display device is positioned so as to at least partially obscure said construct from a view of the operator or to prevent manipulation of said construct by an operator at said display device; and in response to said automatic determination, automatically moving at least a portion of said control construct so as to render said control construct visible on said display device or controllable by said operator.

16. The method of claim 15, wherein said automatic moving step automatically moves at least a portion of said remaining objects.

17. The method of claim 15, wherein said automatic determining step automatically determines if at least one of said remaining objects on said display device overlies said control construct on said display device.

18. The method of claim 15, wherein none of said remaining objects overlie said control construct on said display device subsequent to said automatic moving of said control construct.

19. The method of claim 15, wherein said automatic moving step moves said control construct independently of said window object.

20. The method of claim 15, wherein said automatic moving step automatically moves said control construct from a first position to a second position.

21. The method of claim 15, wherein said automatic moving step automatically resizes said window object on said display device.

22. A computer program product, comprising:

a computer usable medium having computer readable program code means embodied therein for automatically enhancing the visibility or controllability of a control construct which is displayed with other window objects on a display device, the computer readable program code means in the computer program product comprising:

presentation means for displaying said objects, including said window object and said control construct, on said display device;

electronic decision means for automatically determining that said control construct displayed on said display device is positioned so as to at least partially obscure said construct from a view of the operator or to prevent manipulation of said construct by the operator at said display device; and electronic positioning means operable in response to said determination means, for automatically moving at least a portion of said control construct so as to render said control construct visible on said display device or controllable by said operator.

23. The computer program product of claim 22, wherein the said electronic positioning means comprises means for automatically moving at least a portion of said remaining objects.

24. The computer program product of claim 22, wherein said electronic decision means comprises means for automatically determining that at least one of said remaining objects on said display device overlies said control construct on said display device.

25. The computer program product of claim 22, wherein none of said remaining objects overlie said control construct on said display device subsequent to said moving of said control construct by said electronic positioning means.

26. The computer program product of claim 22, wherein said electronic positioning means comprises means for automatically moving said control construct independently of said window object.

27. The computer program product of claim 22, wherein said electronic positioning means comprises means for automatically moving said control construct from a first position to a second position.

28. The computer program product of claim 22, wherein said electronic positioning means comprises means for automatically resizing said window object on said display device.

* * * * *